(12) United States Patent
Takeno et al.

(10) Patent No.: US 6,647,488 B1
(45) Date of Patent: Nov. 11, 2003

(54) PROCESSOR

(75) Inventors: Takumi Takeno, Kawasaki (JP); Kenichi Nabeya, Kawasaki (JP); Junya Matsushima, Kawasaki (JP); Daisuke Ban, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 698 days.

(21) Appl. No.: 09/614,455

(22) Filed: Jul. 12, 2000

(30) Foreign Application Priority Data

Nov. 11, 1999 (JP) .......................................... 11-321195

(51) Int. Cl.$^7$ ................................................ G06F 9/30
(52) U.S. Cl. ...................................... 712/212; 712/211
(58) Field of Search .......................... 703/26; 712/211, 712/212

(56) References Cited

U.S. PATENT DOCUMENTS

| | | | | |
|---|---|---|---|---|
| 4,959,780 A | * | 9/1990 | Miyoshi | 712/212 |
| 5,233,695 A | * | 8/1993 | Miyoshi | 712/212 |
| 5,630,083 A | * | 5/1997 | Carbine et al. | 712/212 |
| 5,742,801 A | | 4/1998 | Fukushima et al. | |
| 6,032,252 A | * | 2/2000 | Petro et al. | 712/233 |
| 6,105,125 A | * | 8/2000 | Nemirovsky et al. | 712/209 |
| 6,356,995 B2 | * | 3/2002 | Chen | 712/209 |
| 6,430,674 B1 | * | 8/2002 | Trivedi et al. | 712/43 |

FOREIGN PATENT DOCUMENTS

| | | |
|---|---|---|
| JP | 8-339298 | 12/1996 |
| JP | 9-330219 | 12/1997 |

* cited by examiner

*Primary Examiner*—William M. Treat
(74) *Attorney, Agent, or Firm*—Staas & Halsey LLP

(57) ABSTRACT

A processor is adapted to support a complex instruction set without making major modifications to the existing hardware but by adding just a few controls and thereby emulating instructions in hardware. The processor is implemented by adding, to the existing processor, a second instruction decoder for decoding an expanded instruction code not capable of issuing an instruction per cycle, and for issuing one instruction per cycle by translating the expanded instruction code into a sequence of basic instructions; a counter for counting the number of instructions to be issued by the second instruction decoder, and for outputting a signal indicating that the expanded instruction code is being executed; and an instruction selection unit for selecting the instruction issued from the first instruction decoder when executing a basic instruction code and the instruction issued from the second instruction decoder when executing the expanded instruction code.

24 Claims, 19 Drawing Sheets

PROCESSOR

BACKGROUND OF THE INVENTION

1. Field of the Invention

The present invention relates to a processor for a computer and, more particularly, to a functional expansion of a processor having an instruction set consisting of basic instructions capable of being issued per cycle.

2. Description of the Related Art

Various microprocessors employing a RISC architecture have been commercially introduced in recent years. RISC is an acronym for Reduced Instruction Set Computer, and a RISC architecture aims to improve cost performance (cost to performance ratio) by providing an instruction set consisting only of basic and simple instructions whose frequency of use is high, and by executing an instruction sequence, optimally scheduled using compiler techniques, at high speed with simple hardware configuration.

In such a RISC architecture, the instruction length is fixed, and maximum use is made of pipeline control. Previously, only simple instruction sets were used so that all pipeline stages can be passed through in a single cycle. However, in recent RISC architectures, there is a tendency to add instructions for performing complex operations. Such instructions include, for example, those for transferring large amounts of data to enhance graphics capabilities.

When newly adding a complex instruction set to a processor designed to handle a simple instruction set, the hardware design has to be redone from scratch, which leads to the problem that the man-hours required for development increases. On the other hand, it is also practiced to handle such a complex instruction as an illegal instruction and emulate the instruction in software by causing a trap interrupt and by interpreting the instruction code by software. This, however, defeats the purpose of using a performance enhancing instruction set, since the intended increase in performance cannot be achieved because of the increased overhead due to the trap interrupt.

SUMMARY OF THE INVENTION

The present invention has been devised in view of the above problems, and an object of the invention is to provide a processor capable of supporting a complex instruction set while dramatically improving the performance compared with a method relying on software, without making major modifications to the existing hardware but by adding just a few controls and thereby emulating instructions ($\mu$ operation) in hardware.

To achieve the above object, according to a first aspect of the invention, there is provided a processor comprising: instruction code holding means for fetching and holding a basic instruction code capable of issuing an instruction per cycle or an expanded instruction code not capable of issuing an instruction per cycle; a first instruction decoder for issuing an instruction by decoding the basic instruction code held in the instruction code holding means; a second instruction decoder for decoding the expanded instruction code held in the instruction code holding means, and for issuing one instruction per cycle by translating the expanded instruction code into a sequence of multiple instructions; a counter for counting the number of instructions to be issued by the second instruction decoder, and for outputting a signal indicating that the expanded instruction code is being executed; instruction selecting means for selecting the instruction issued from the first instruction decoder when executing the basic instruction code and the instruction issued from the second instruction decoder when executing the expanded instruction code; execution instruction holding means for holding the instruction output from the instruction selecting means; and instruction executing means for executing the contents of the instruction held in the execution instruction holding means.

According to a second aspect of the invention, preferably the processor described in the first aspect further comprises means for inhibiting a program counter from being updated each time an instruction is issued by the second instruction decoder.

According to a third aspect of the invention, preferably the processor described in the first aspect further comprises means for detecting completion of all instructions previously issued by the first instruction decoder, and the second instruction decoder starts issuing instructions after confirming that an output of the detecting means is on.

According to a fourth aspect of the invention, preferably the processor described in the third aspect further comprises means for generating a flag that is set on when the second instruction decoder has started issuing instructions, and is set off when all the issued instructions are completed, and the first instruction decoder does not issue instructions during the on period of the flag.

According to a fifth aspect of the invention, preferably the processor described in the first aspect further comprises means for generating a signal indicating that instructions are being issued successively by the second instruction decoder, and means for generating, in accordance with the signal, a snap-shot of hardware resources each time an instruction is issued by the second instruction decoder.

According to a sixth aspect of the invention, preferably the processor described in the first aspect further comprises means for generating a flag that is set on when the first instruction is issued by the second instruction decoder, and is set off when the last of the instructions issued by the second instruction decoder is completed, and the first instruction decoder does not issue instructions during the on period of the flag.

According to a seventh aspect of the invention, preferably the processor described in the first aspect further comprises means for generating a flag that is set on when the first instruction is issued by the second instruction decoder, and is set off when the last of the instructions issued by the second instruction decoder is completed, and means for inhibiting asynchronous interrupts during the on period of the flag.

According to an eighth aspect of the invention, preferably the processor described in the first aspect further comprises means for generating a flag that is set on when the first instruction is issued by the second instruction decoder, and is set off when the last of the instructions issued by the second instruction decoder is completed, and a counter which monitors an instruction complete signal from the instruction executing means during the on period of the flag, and counts up each time the signal is set on, and when the counter has counted up to a value equal to the number of instructions to be issued by the second instruction decoder, the processor is transferred to an expanded instruction code execution complete state.

According to a ninth aspect of the invention, preferably the processor described in the first aspect further comprises means for performing control so that no interrupts occur during the issuing of instructions by the second instruction decoder, by confirming that asynchronous interrupts are not likely to occur before the instruction issued by the second instruction decoder is started.

According to a 10th aspect of the invention, preferably the processor described in the first aspect further comprises means for detecting an illegal condition of the expanded instruction code in the first instruction issue cycle of the second instruction decoder and, when an illegal condition is detected, causing an interrupt to inhibit the second instruction decoder from issuing the instruction sequence.

According to an 11th aspect of the invention, preferably the processor described in the first aspect further comprises means for detecting completion of all instructions previously issued by the first instruction decoder, and means for generating a snap-shot of hardware resources only when the second instruction decoder issues the first instruction, but not generating a snap-shot when the second instruction decoder issues the subsequent instructions.

According to a 12th aspect of the invention, preferably the processor described in the first aspect further comprises means for masking an output of an address-stopping address match detection circuit during the execution of the instructions issued by the second instruction decoder and for reporting an address match result to an interrupt control circuit when the execution of the last of the instructions issued by the second instruction decoder is completed.

According to a 13th aspect of the invention, preferably, in the processor described in any of the first to 12th aspects, the expanded instruction code to be decoded by the second instruction decoder is a block data transfer instruction code for specifying a transfer of data whose data size is an integral multiple of the data size transferrable by one basic instruction.

BRIEF DESCRIPTION OF THE DRAWINGS

Further features and advantages of the present invention will be apparent from the following description with reference to the accompanying drawings, in which.

DESCRIPTION OF THE PREFERRED EMBODIMENTS

Figures 1, 2:
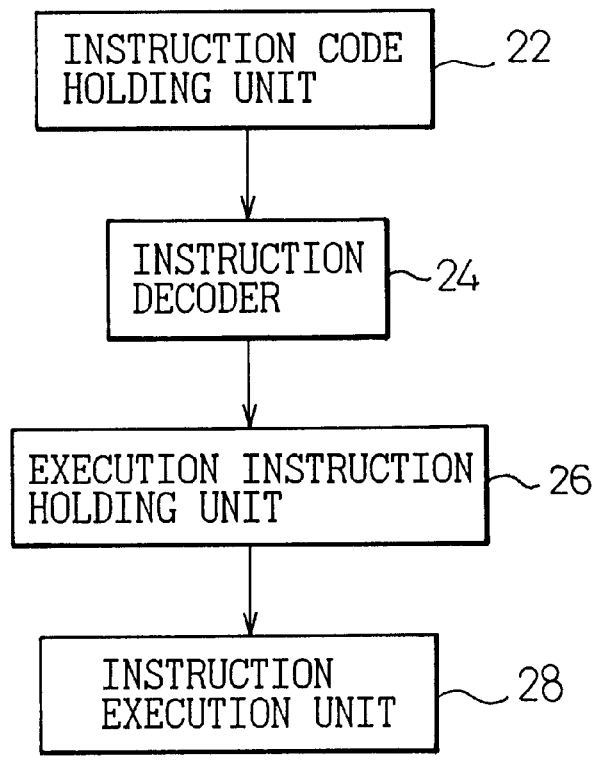
FIG. 1 is a block diagram showing the hardware configuration of a processor according to the prior art.
FIG. 2 is a time chart for explaining the operation of the processor of FIG. 1.

Embodiments of the present invention will be described below with reference to the accompanying drawings. First, the prior art will be described to facilitate understanding of the present invention. FIG. 1 is a block diagram showing the hardware configuration of a processor according to the prior art. FIG. 2 is a time chart for explaining the operation of the processor of FIG. 1. As shown in FIG. 1, the prior art processor basically comprises an instruction code holding unit 22 for fetching and holding an instruction code, an instruction decoder 24 for decoding the instruction code and for issuing a decoded instruction, an execution instruction holding unit 26 for holding the decoded instruction as hardware control information, and an instruction execution unit 28 for executing the contents of the instruction held in the execution instruction holding unit.

As shown in FIG. 2, the operation specified by one instruction is performed through four stages synchronized to clock cycles, i.e., an FE (fetch) stage, a DE (decode) stage, an EX (execution) stage, and a WR (write back) stage; several instructions are processed in concurrent fashion, passing from one stage to the next as though they were on an assembly line.

When newly supporting a complex instruction set (expanded instruction set) in addition to the existing simple instruction set (basic instruction set) capable of such pipeline control, if hardware design is to be redone from scratch, an enormous number of man-hours would be required for development. In view of this, the present invention is intended to support a complex instruction set by making just a few changes to the existing hardware configuration shown in FIG. 1.

Figure 3:
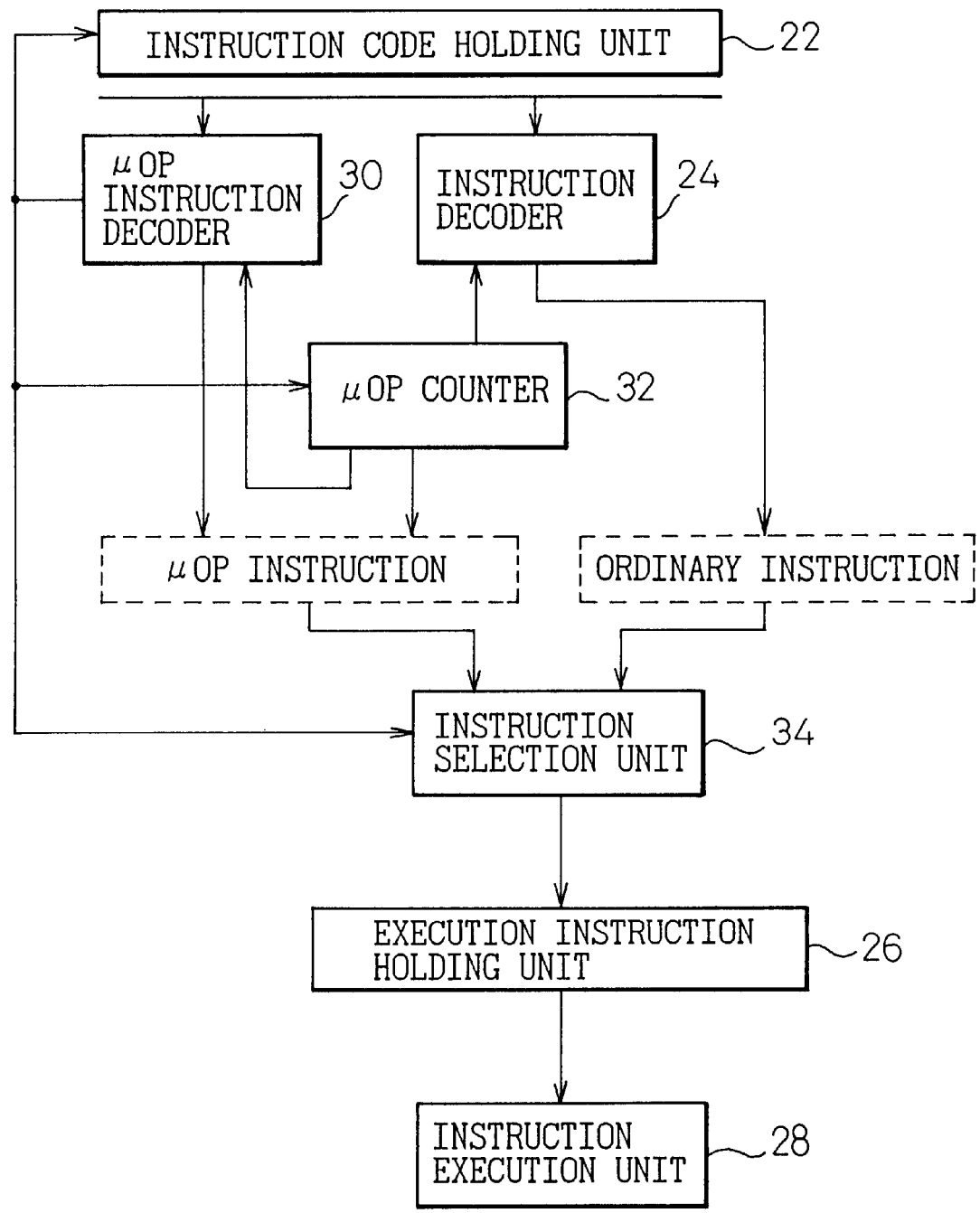
FIG. 3 is a block diagram showing the hardware configuration of a processor according to a first embodiment of the present invention.
Figure 4:
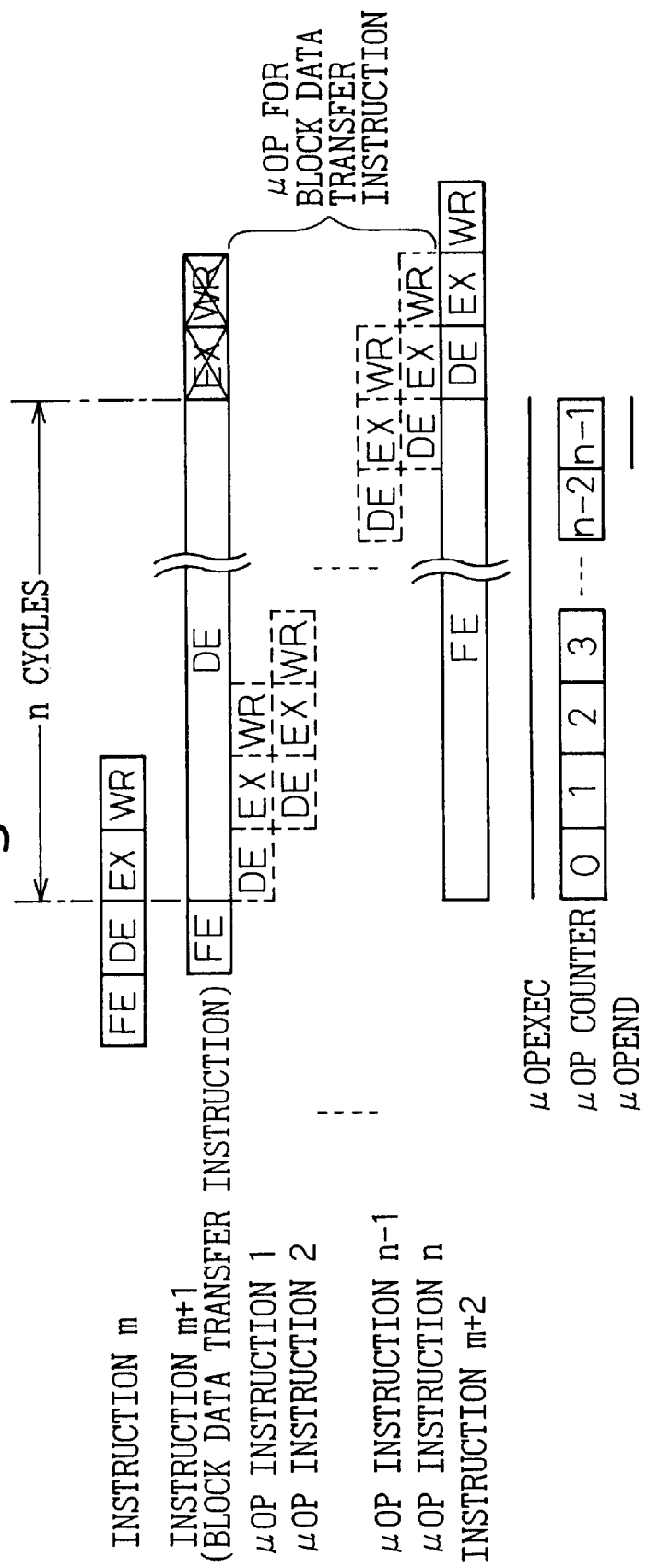
FIG. 4 is a time chart for explaining the operation of the first embodiment.

FIG. 3 is a block diagram showing the hardware configuration of a processor according to a first embodiment of the present invention. FIG. 4 is a time chart for explaining the operation of the first embodiment. The instruction code holding unit 22, instruction decoder 24, execution instruction holding unit 26, and instruction execution unit 28 shown in FIG. 3 are the same as the instruction code holding unit 22, instruction decoder 24, execution instruction holding unit 26, and instruction execution unit 28 of the prior art shown in FIG. 1; the configuration of FIG. 3 differs from that of FIG. 1 by the inclusion of a μOP (micro operation) instruction decoder 30, a μOP counter 32, and an instruction selection unit 34.

When a basic instruction code is fetched and held in the instruction code holding unit 22, the instruction decoder 24 decodes the basic instruction code and outputs an ordinary instruction (basic instruction), and the ordinary instruction is issued via the instruction selection unit 34, is held in the execution instruction holding unit 26, and is executed by the instruction execution unit 28 in the same manner as the prior art operation described with reference to FIG. 1.

On the other hand, when an expanded instruction code is fetched and held in the instruction code holding unit 22, that is, when an instruction m+1 is fetched, as shown in FIG. 4, the following operation is performed. Here, the expanded instruction m+1 is an example of a block data transfer instruction specifying a memory-to-register transfer of data whose data size is an integral multiple of the data size transferrable by one basic instruction. For example, when an 8-byte data transfer instruction is supported as a basic instruction, a transfer instruction specifying a transfer of 64 bytes is an example of the block data transfer instruction.

First, in the FE stage of the instruction m+1, the instruction code is fed from the instruction code holding unit 22 into the μOP instruction decoder 30. Then, at the beginning of the DE stage of the instruction m+1, the μOP instruction decoder 30 recognizes that the instruction code indicates a block data transfer instruction which is an expanded instruction. Upon recognizing the expanded instruction code, the μOP instruction decoder 30 instructs the instruction code holding unit 22 to hold the expanded instruction code until the issuing of μOP (micro operation) instructions, a set of basic instructions implementing the expanded instruction, is completed.

Then, the μOP instruction decoder 30 translates the expanded instruction code into n basic instructions consisting of a μOP instruction 1, a μOP instruction 2, . . . , a μOP instruction n−1, and a μOP instruction n, and issues the μOP instructions at a rate of one instruction per cycle for supply to the instruction selection unit 34. For example, in the case of a 64-byte block data transfer instruction, an 8-byte data transfer instruction is issued eight times by changing the source and destination addresses each time.

In the meantime, the μOP instruction decoder 30 sends to the instruction selection unit 34 a signal indicating that the issuing of the μOP instructions is in progress. During the time that this signal is on, the instruction selection unit 34 selects each instruction supplied from the μOP instruction decoder 30 for supply to the execution instruction holding unit 26. At the same time, the μOP instruction decoder 30 notifies the μOP counter 32 of the issuing of the μOP instructions.

When the μOP instruction issue notification is received from the μOP instruction decoder 30, the μOP counter 32 starts counting for issuing the n instructions. During the time that the μOP instructions are being issued, the μOP counter 32 sets a signal μOPEXEC on, as shown in FIG. 4, to indicate that the μOP instructions are being executed. Then, at the end of the counting of n cycles, the μOP counter 32 sends a signal μOPEND to the μOP instruction decoder 30, as shown in FIG. 4, to indicate the end of the multiple-instruction issue cycle. Finally, the μOP counter 32 is reset to get ready for the next issuing of μOP instructions.

Thus, according to the present embodiment, the processor originally designed to support only basic instruction code capable of issuing an instruction per cycle can be made to support expanded instruction code not capable of issuing an instruction per cycle, by making simple changes to the hardware and by breaking up the expanded instruction code into a sequence of n basic instructions and issuing one instruction per cycle. Hereinafter, embodiments that further improve the above embodiment will be described.

Figure 5:
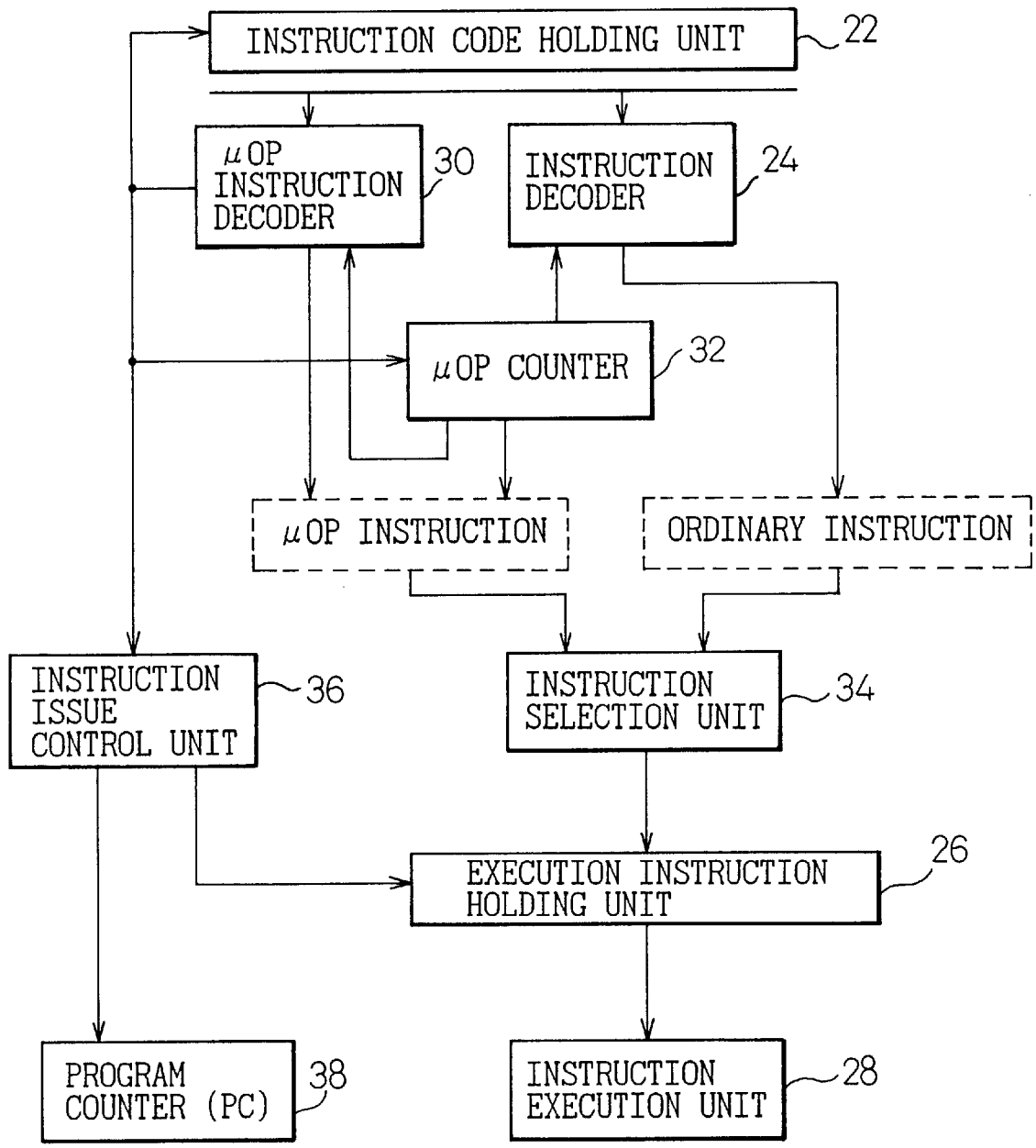
FIG. 5 is a block diagram showing the hardware configuration of a processor according to a second embodiment of the present invention.

FIG. 5 is a block diagram showing the hardware configuration of a processor according to a second embodiment of the present invention. Elements that are identical to those in the foregoing embodiment will be designated by the same reference numerals and will not be described in detail herein. Generally, a processor includes a program counter (PC) 38 which holds the address in main memory pointing to the location where the instruction currently being executed or to be executed next is stored.

In the second embodiment, an instruction issue control unit 36 is provided to prevent the program counter 38 from being updated for each instruction issued from the μOP instruction decoder 30. The instruction issue control unit 36 performs control so that, when executing μOP instructions, the program counter is updated for each execution of one expanded instruction, while allowing the execution instruction holding unit 26 and the instruction execution unit 28 to operate in the usual manner. In this way an expanded instruction such as a block data transfer instruction can be made to appear as one instruction to software, and multi-cycle instructions can thus be supported without making any changes to the existing software.

Figure 6:
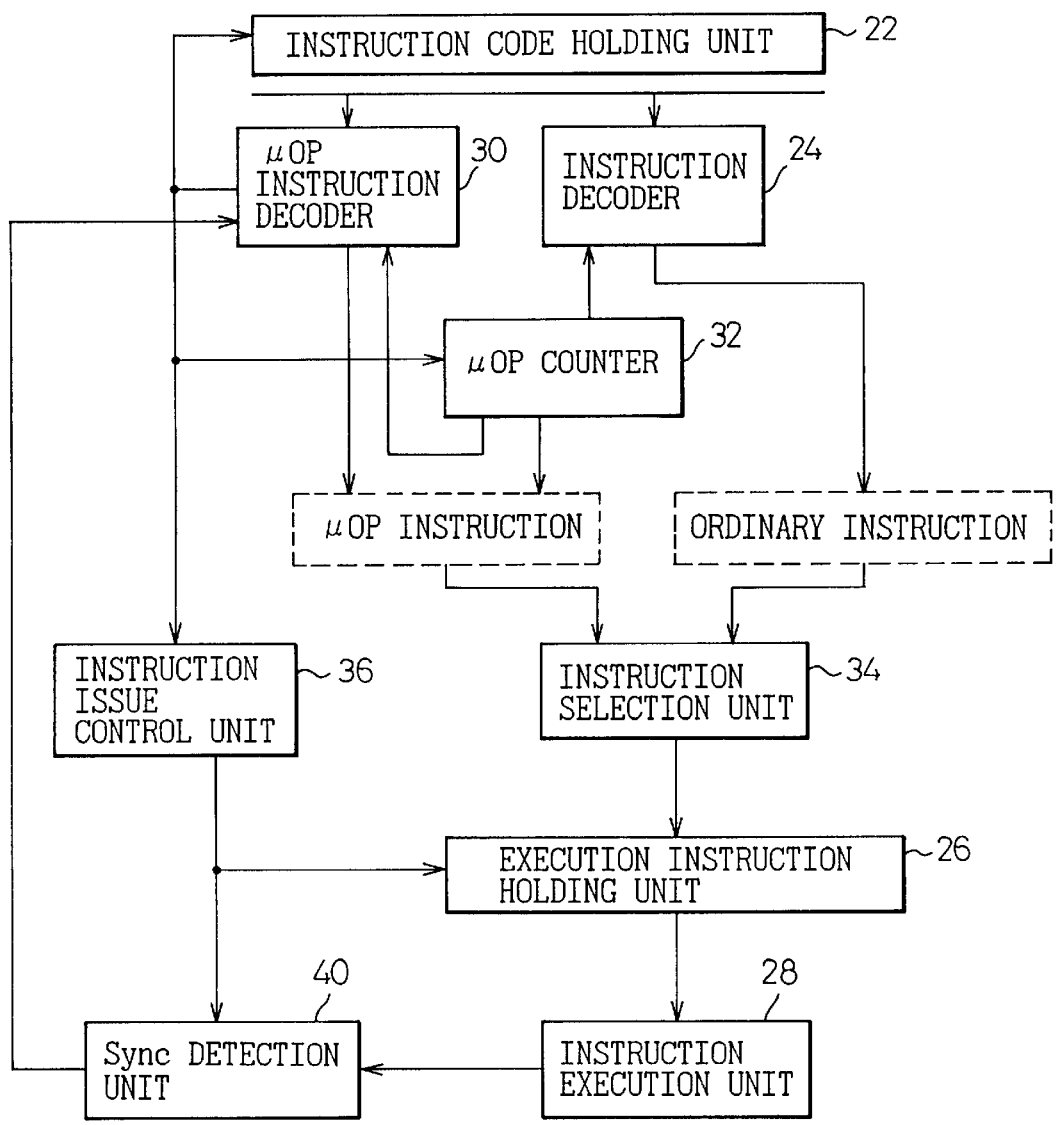
FIG. 6 is a block diagram showing the hardware configuration of a processor according to a third embodiment of the present invention.
Figure 7:
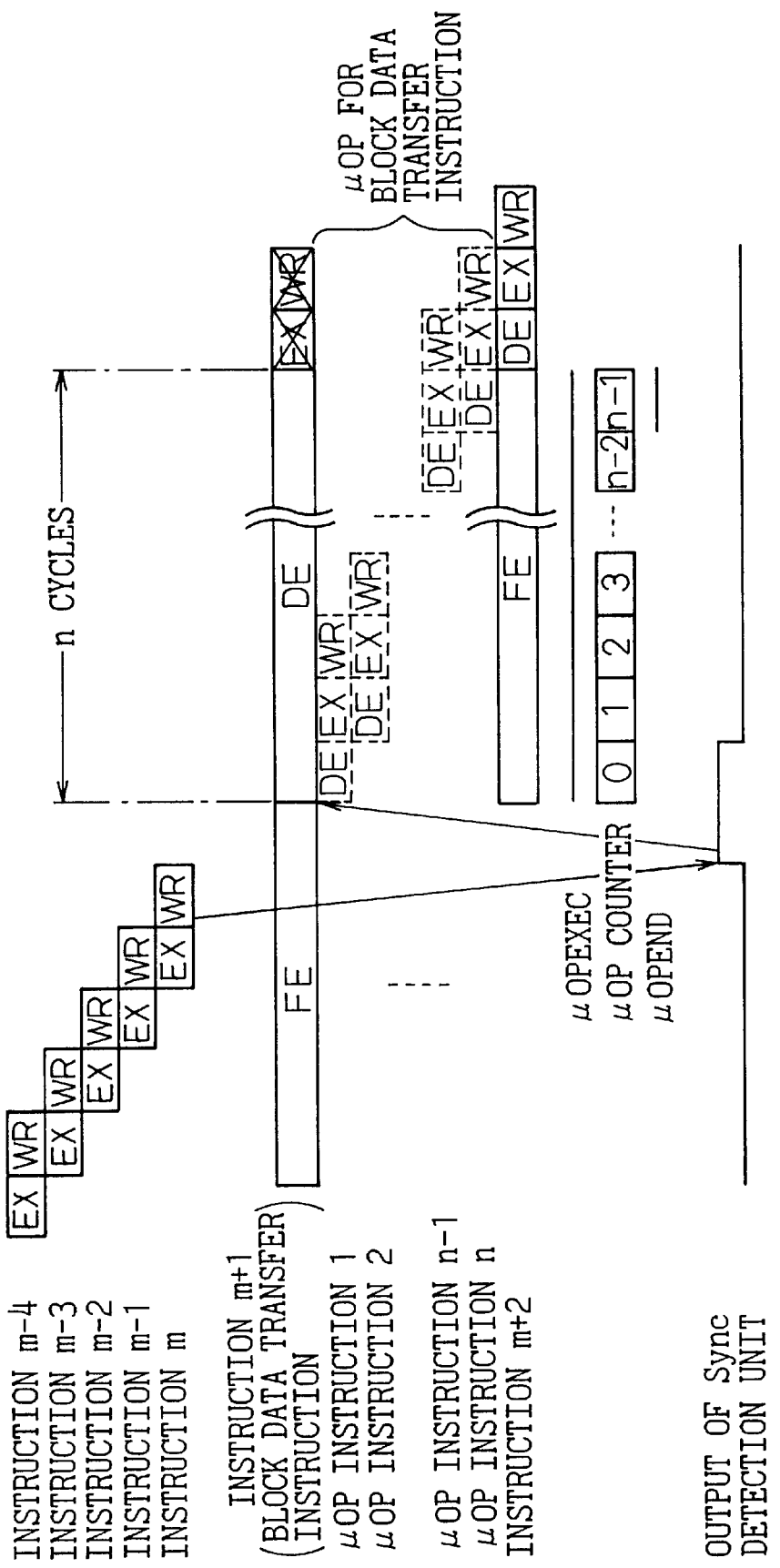
FIG. 7 is a time chart for explaining the operation of the third embodiment.

FIG. 6 is a block diagram showing the hardware configuration of a processor according to a third embodiment of the present invention. FIG. 7 is a time chart for explaining the operation of the third embodiment. Elements that are identical to those in the foregoing embodiments will be designated by the same reference numerals and will not be described in detail herein. In this embodiment, a Sync detection unit 40 is provided that detects, based on the output of the instruction issue control unit 36, the completion of all the instructions previously issued by the instruction decoder 24. More specifically, the Sync detection unit 40 sets its output on at the completion of the WR stage of the instruction m preceding the instruction m+1 (block data transfer instruction).

The μOP instruction decoder 30 starts issuing instructions after confirming that the output of the Sync detection unit 40 is on. More specifically, as shown in FIG. 7, after the output of the Sync detection unit 40 is set on, the DE stage of the instruction m+1 (block data transfer instruction) is started. This guarantees that all preceding instructions are completed before the execution of an expanded instruction such as a block data transfer instruction. Accordingly, the expanded instruction is prevented from being mixed into a sequence of ordinary basic instructions, so that the hardware of the existing instruction execution unit can be used without modification. That is, there is no need to discriminate between expanded instructions and ordinary basic instructions.

Figure 8:
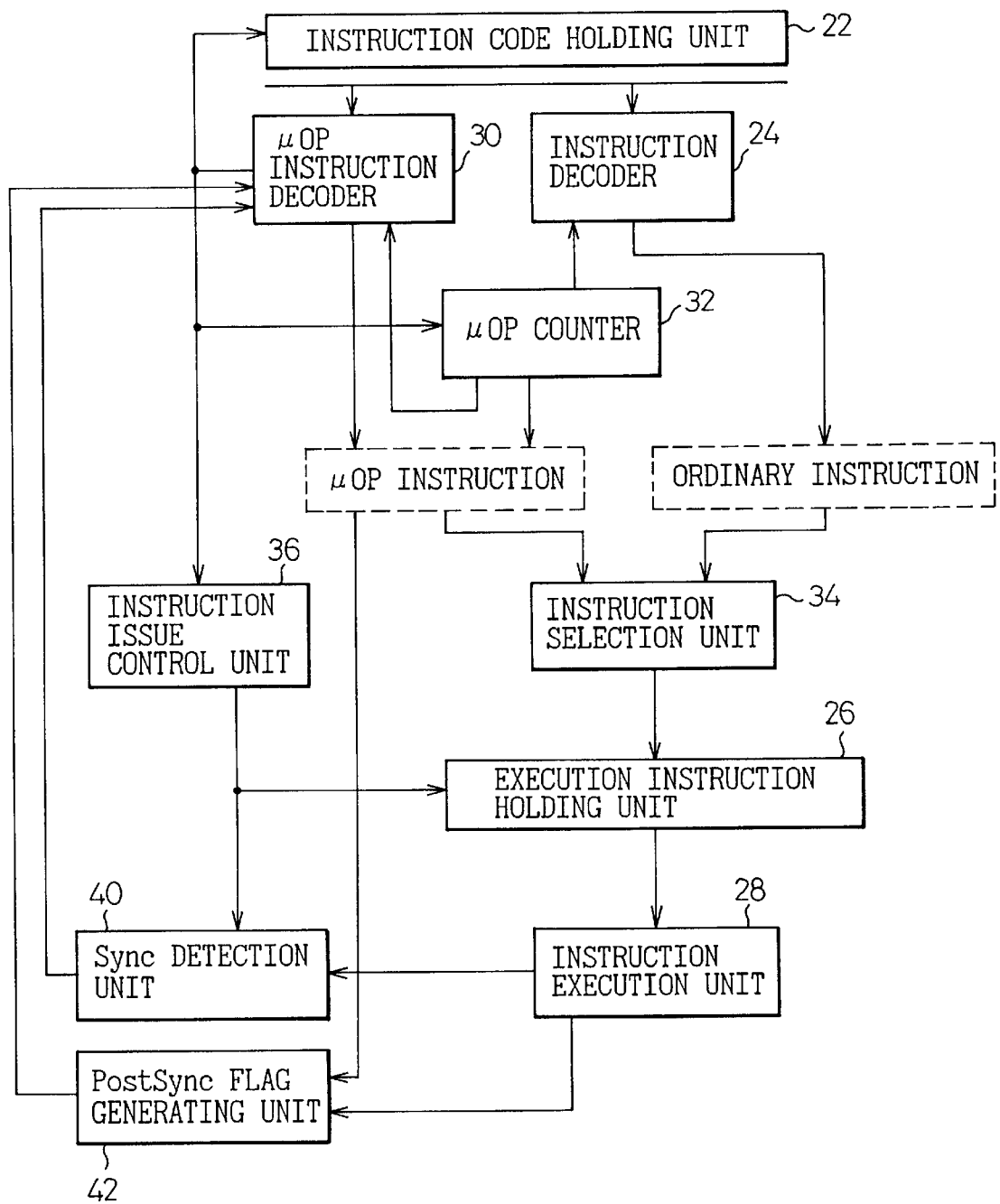
FIG. 8 is a block diagram showing the hardware configuration of a processor according to a fourth embodiment of the present invention.
Figure 9:
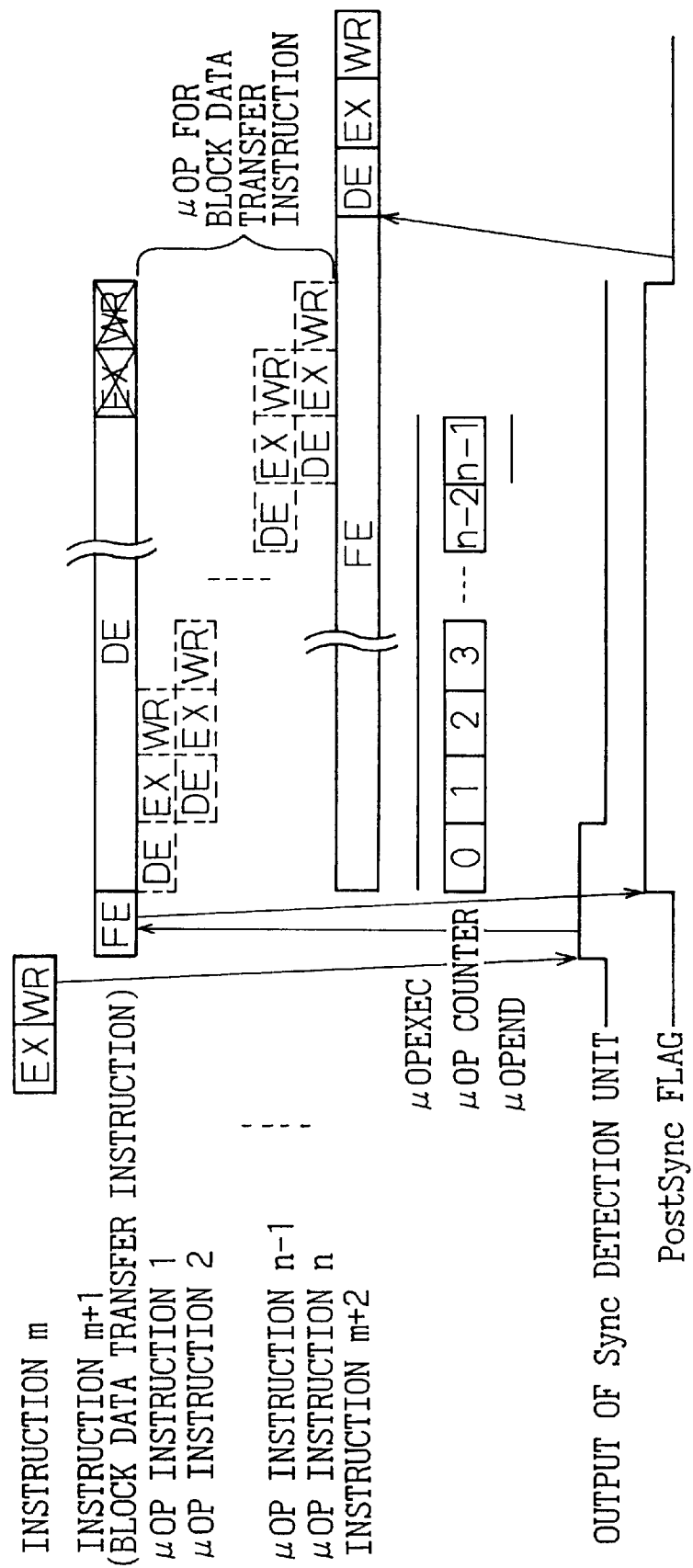
FIG. 9 is a time chart for explaining the operation of the fourth embodiment.

FIG. 8 is a block diagram showing the hardware configuration of a processor according to a fourth embodiment of the present invention. FIG. 9 is a time chart for explaining the operation of the fourth embodiment. Elements that are identical to those in the foregoing embodiments will be designated by the same reference numerals and will not be described in detail herein. The fourth embodiment differs from the configuration of the third embodiment by the inclusion of a PostSync flag generating unit 42 which generates a PostSync flag that is set on when the instruction issue by the μOP instruction decoder 30 is started and set off when the issued instructions are all completed.

That is, as shown in FIG. 9, the PostSync flag is set on and stays on throughout the period that the μOP instruction 1, μOP instruction 2, . . . , and μOP instruction n are being issued. During the on period of the PostSync flag, the instruction decoder 24 does not issue instructions. That is, in the example of FIG. 9, the DE stage of an instruction m+2 is suppressed. Accordingly, the expanded instruction is prevented from being mixed into a sequence of ordinary basic instructions, so that the hardware of the existing instruction execution unit can be used without modification.

Figure 10:
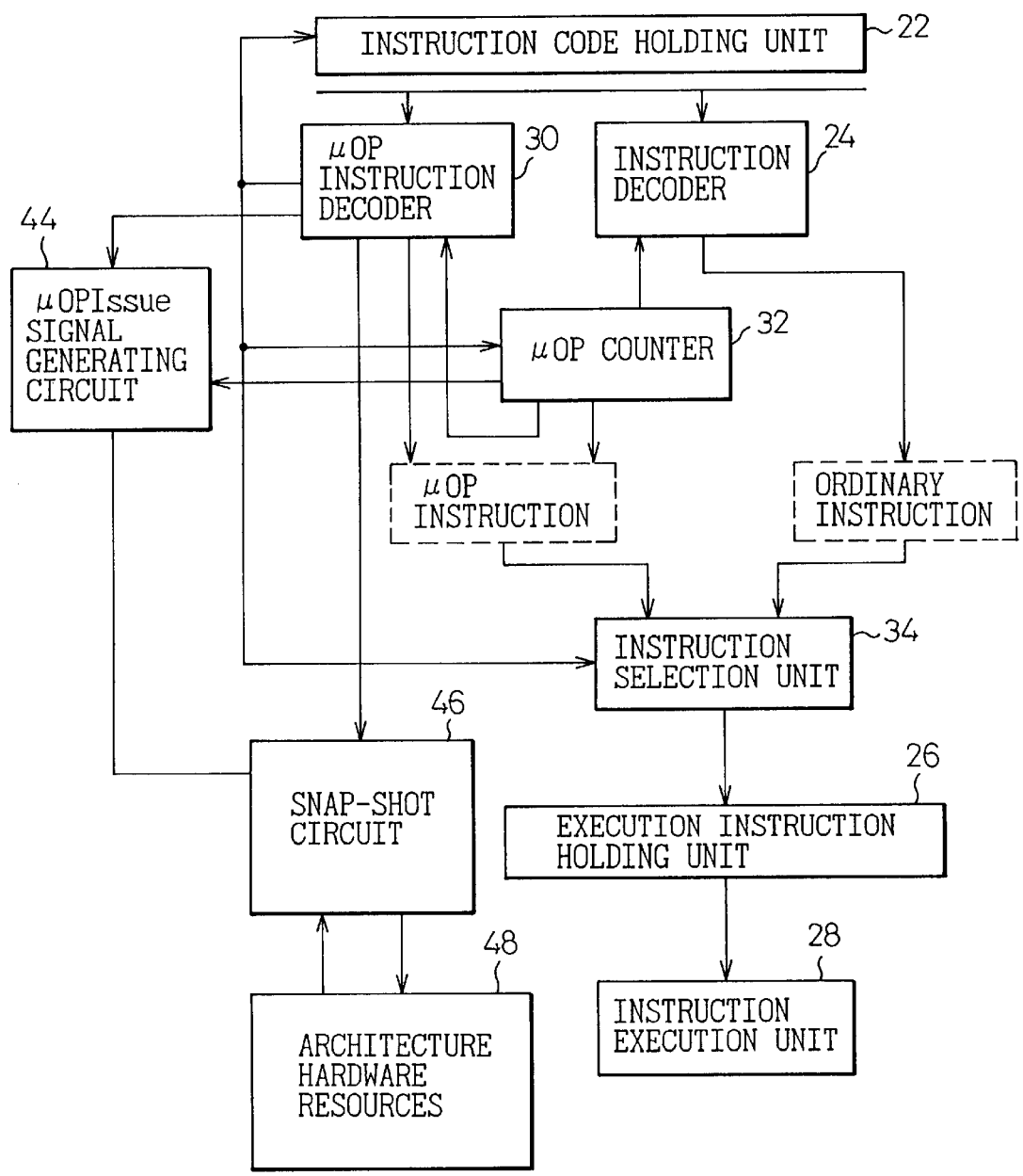
FIG. 10 is a block diagram showing the hardware configuration of a processor according to a fifth embodiment of the present invention.
Figure 11:
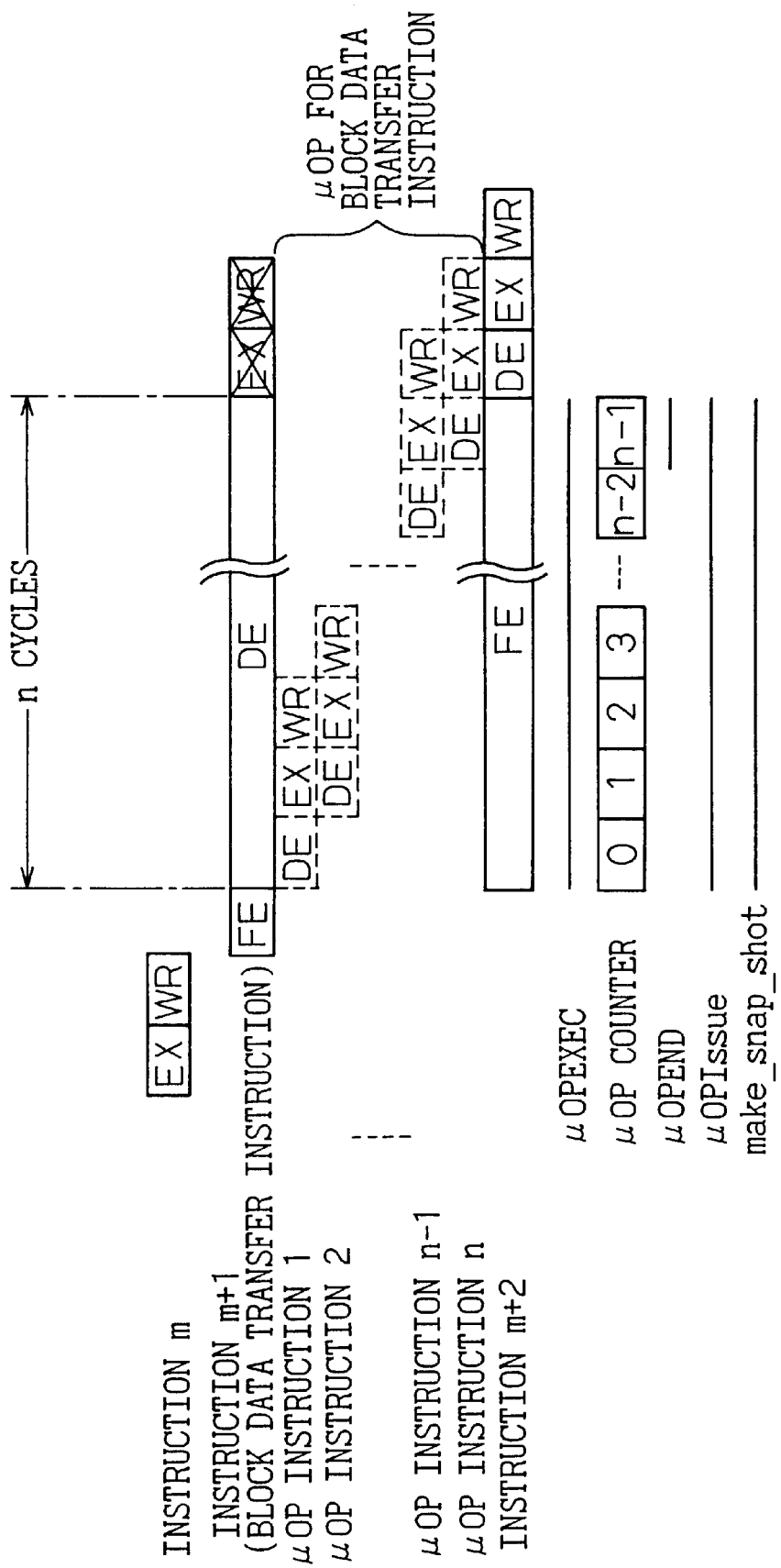
FIG. 11 is a time chart for explaining the operation of the fifth embodiment.

FIG. 10 is a block diagram showing the hardware configuration of a processor according to a fifth embodiment of the present invention. FIG. 11 is a time chart for explaining the operation of the fifth embodiment. Elements that are identical to those in the foregoing embodiments will be designated by the same reference numerals and will not be described in detail herein. In the fifth embodiment, there are provided a μOPIssue signal,generating circuit 44 which generates a μOPIssue signal indicating that instructions are being issued successively by the μOP instruction decoder 30, and a snap-shot circuit 46 which, in accordance with the μOPIssue signal, generates a snap-shot of hardware resources 48 each time an instruction is issued by the μOP instruction decoder 30.

More specifically, as shown in FIG. 11, the μOPIssue signal is set on during the DE stage of each of the μOP instruction 1, μOP instruction 2, . . . , and μOP instruction n. During the on period of the μOPIssue signal, a make_snap_shot signal for instructing the snap-shot circuit 46 to take a snap-shot is set on. In this way, if an exception (an exceptional event such as an access to non-existent memory) occurs in the μOP instruction 1, μOP instruction 2, . . . , or μOP instruction n, processing of the exception can be performed easily.

Figure 12:
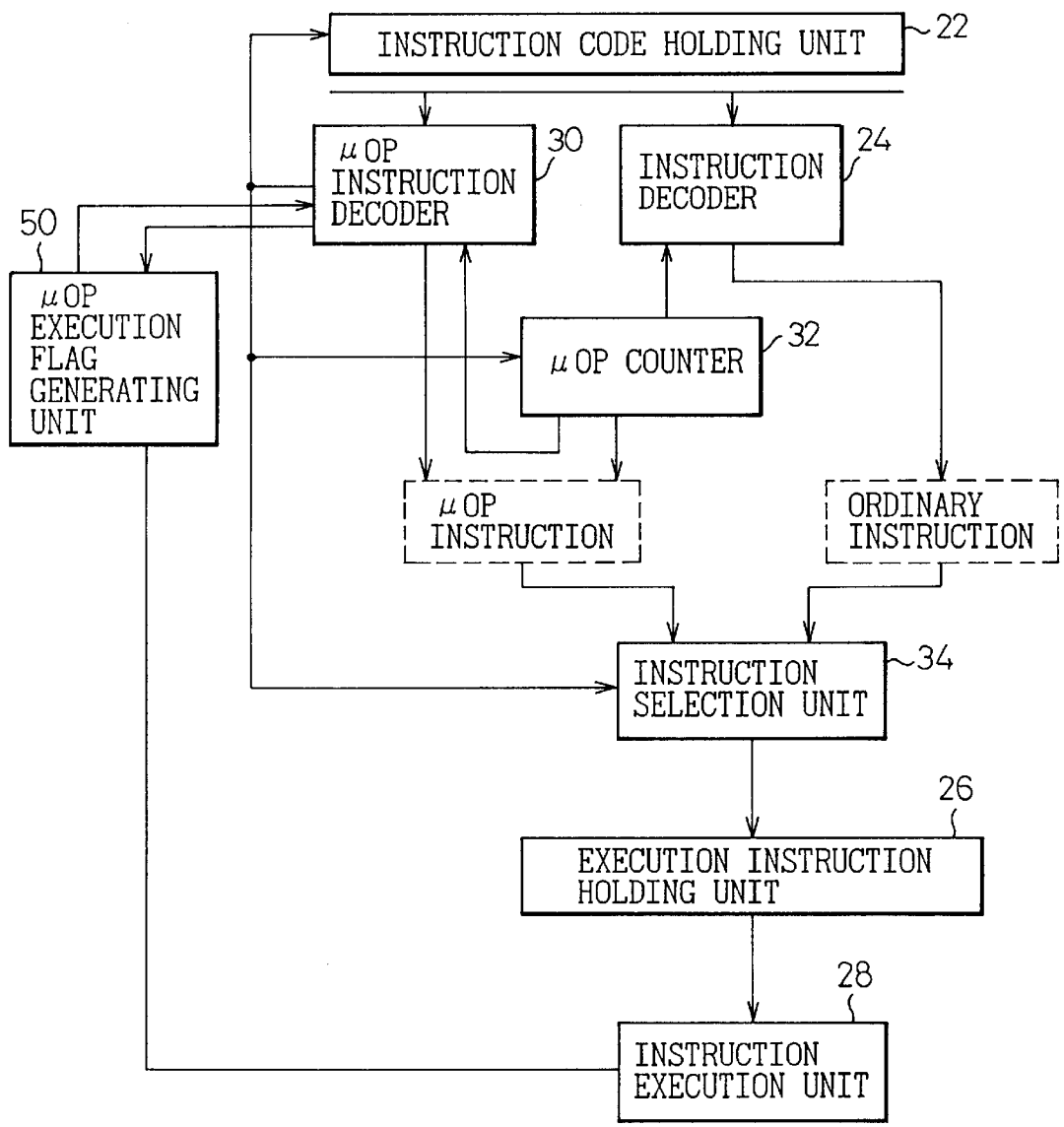
FIG. 12 is a block diagram showing the hardware configuration of a processor according to a sixth embodiment of the present invention.
Figure 13:
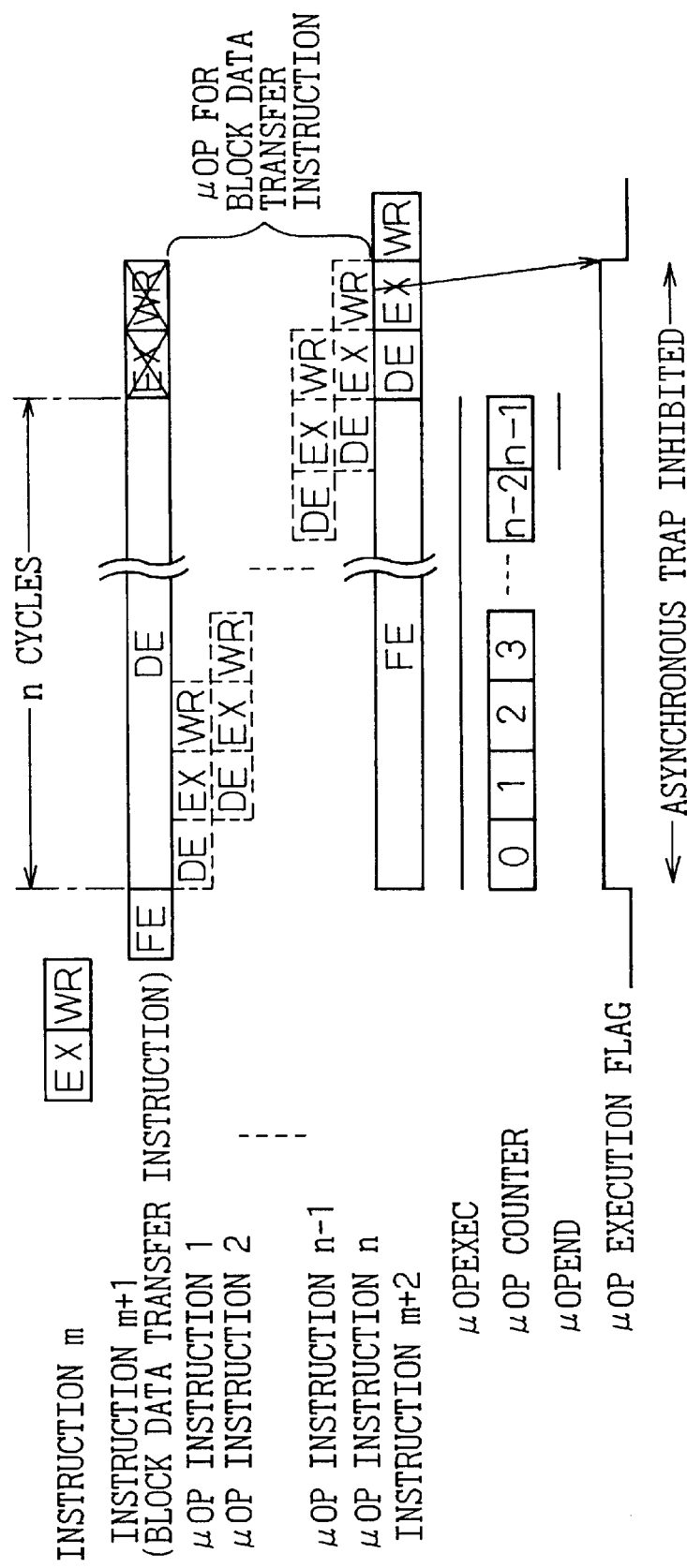
FIG. 13 is a time chart for explaining the operation of the sixth embodiment.

FIG. 12 is a block diagram showing the hardware configuration of a processor according to a sixth embodiment of the present invention. FIG. 13 is a time chart for explaining the operation of the sixth embodiment. Elements that are identical to those in the foregoing embodiments will be designated by the same reference numerals and will not be described in detail herein. In the sixth embodiment, there is provided a μOP execution flag generating unit 50 for generating a μOP execution flag that is set on when the first instruction is issued by the μOP execution decoder 30 and set off when the last of the issued instructions is completed.

More specifically, as shown in FIG. 13, the μOP execution flag is set on at the beginning of the DE stage of the μOP instruction 1 and remains on through to the end of the WR stage of the μOP instruction n. During the on period of the μOP execution flag, the instruction decoder 24 is inhibited from issuing an instruction that follows the expanded instruction such as a block data transfer instruction. Since this serves to separate the ordinary basic instructions from μOP instructions, the hardware can be simplified.

Figure 14:
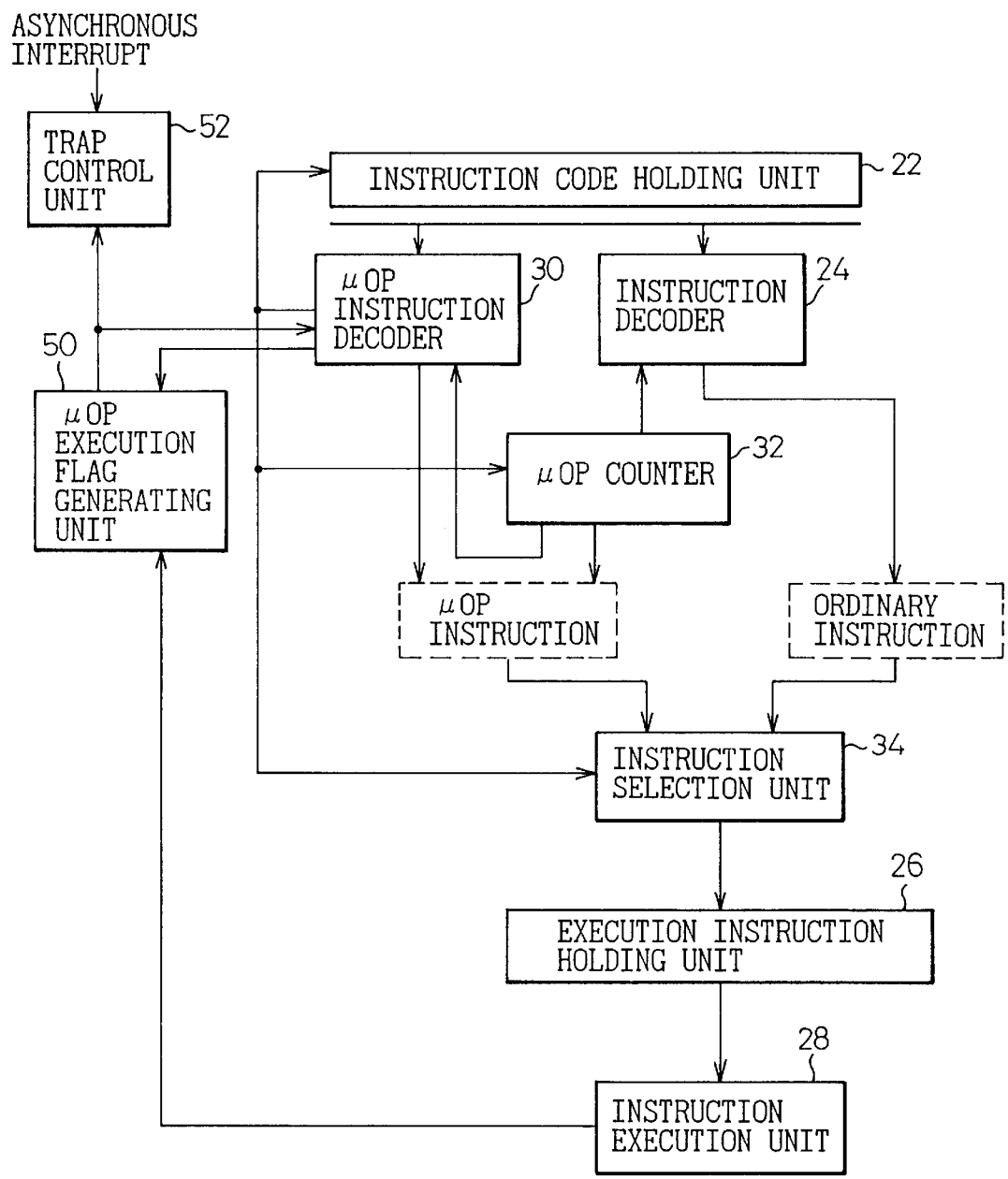
FIG. 14 is a block diagram showing the hardware configuration of a processor according to a seventh embodiment of the present invention.

FIG. 14 is a block diagram showing the hardware configuration of a processor according to a seventh embodiment of the present invention. Elements that are identical to those in the foregoing embodiments will be designated by the same reference numerals and will not be described in detail herein. In the seventh embodiment, as in the sixth embodiment, the μOP execution flag generating unit 50 is provided, and the μOP execution flag is set on as shown in FIG. 13. A trap control unit 52, which controls trap interrupts, refers to the μOP execution flag and inhibits asynchronous interrupts during the on period of the μOP execution flag. This prevents interrupts to software from being caused during the execution of μOP instructions, and thus facilitates interrupt control.

Figure 15:
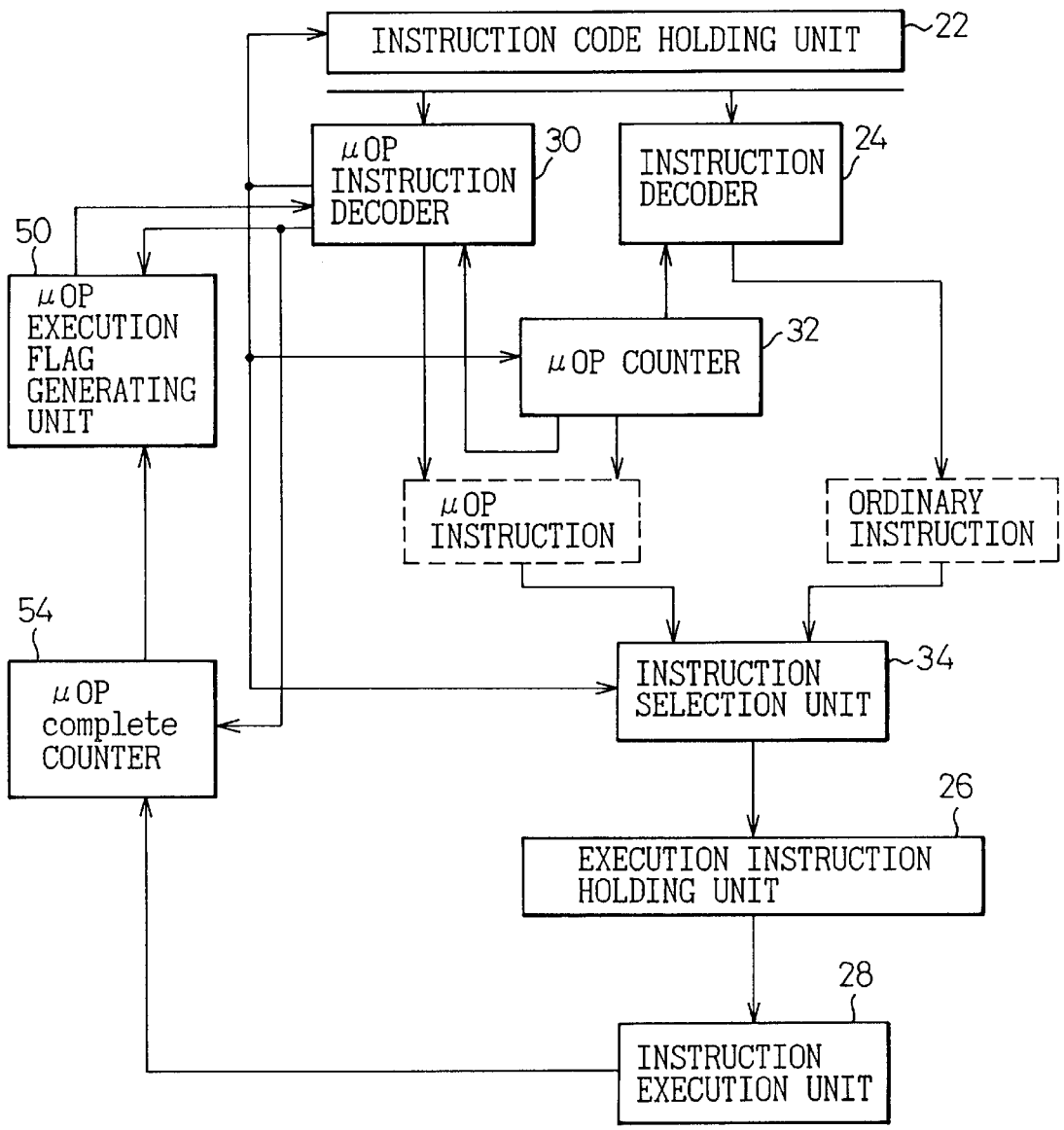
FIG. 15 is a block diagram showing the hardware configuration of a processor according to an eighth embodiment of the present invention.
Figure 16:
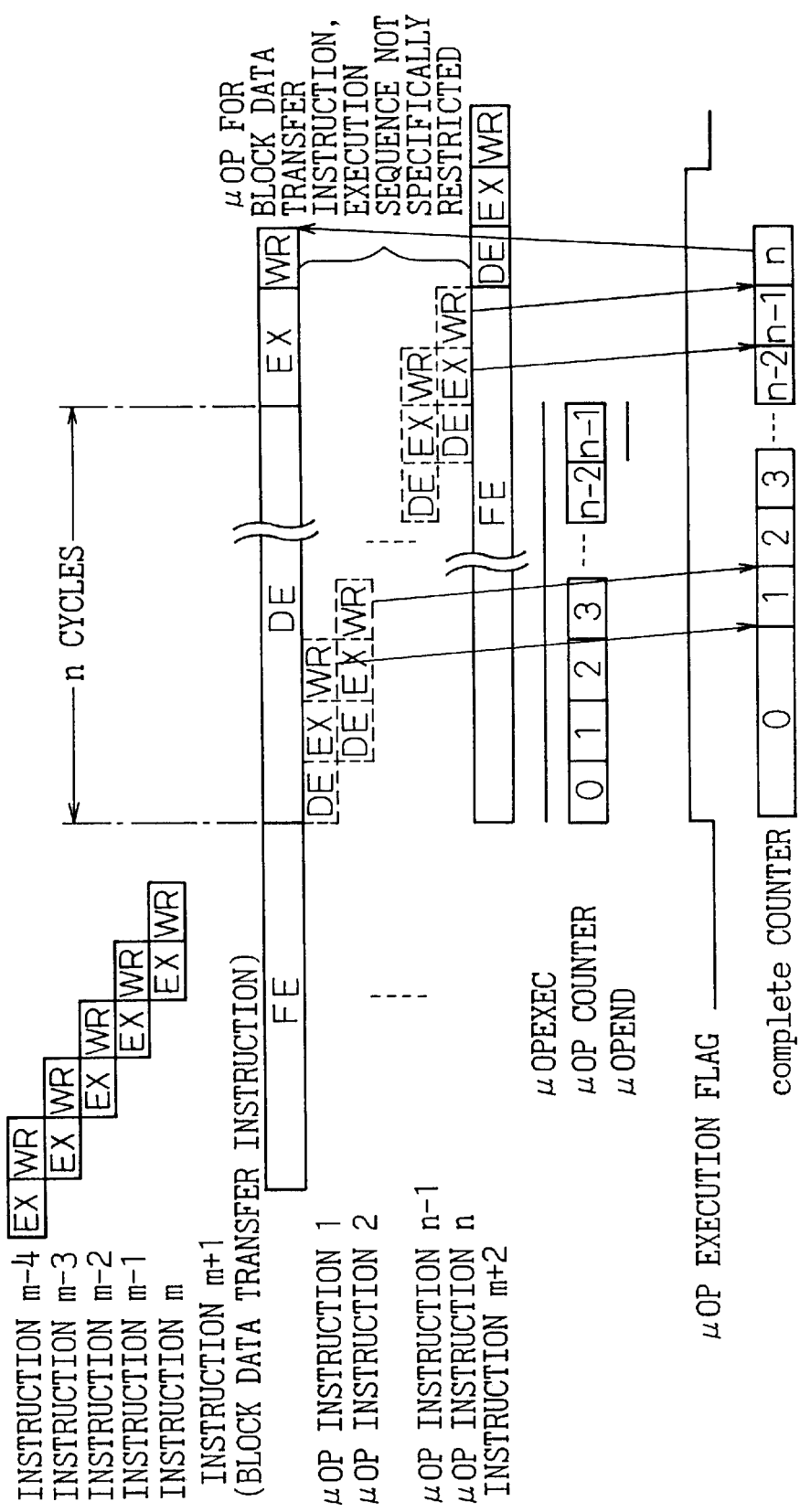
FIG. 16 is a time chart for explaining the operation of the eighth embodiment.

FIG. 15 is a block diagram showing the hardware configuration of a processor according to an eighth embodiment of the present invention. FIG. 16 is a time chart for explaining the operation of the eighth embodiment. Elements that are identical to those in the foregoing embodiments will be designated by the same reference numerals and will not be described in detail herein. In the eighth embodiment, there is provided, in addition to the above-described μOP execution flag generating unit 50, a μOP complete counter 54 which monitors an instruction complete signal from the instruction execution unit 28 during the on period of the μOP execution flag, and counts up each time the instruction complete signal is set on.

More specifically, the value of the μOP complete counter 54 is incremented at the completion of the WR stage of each of the μOP instruction 1, μOP instruction 2, . . . , and μOP instruction n. When the value of the μOP complete counter 54 reaches u which is the number of instructions to be issued by the μOP instruction decoder 30, it is determined that all the μOP instructions have been completed, and the processor is transferred to a block data transfer instruction complete state, that is, an expanded instruction code execution complete state. There is thus no need to change the control logic for out-of-order processing in the instruction execution unit 28.

Figure 17:
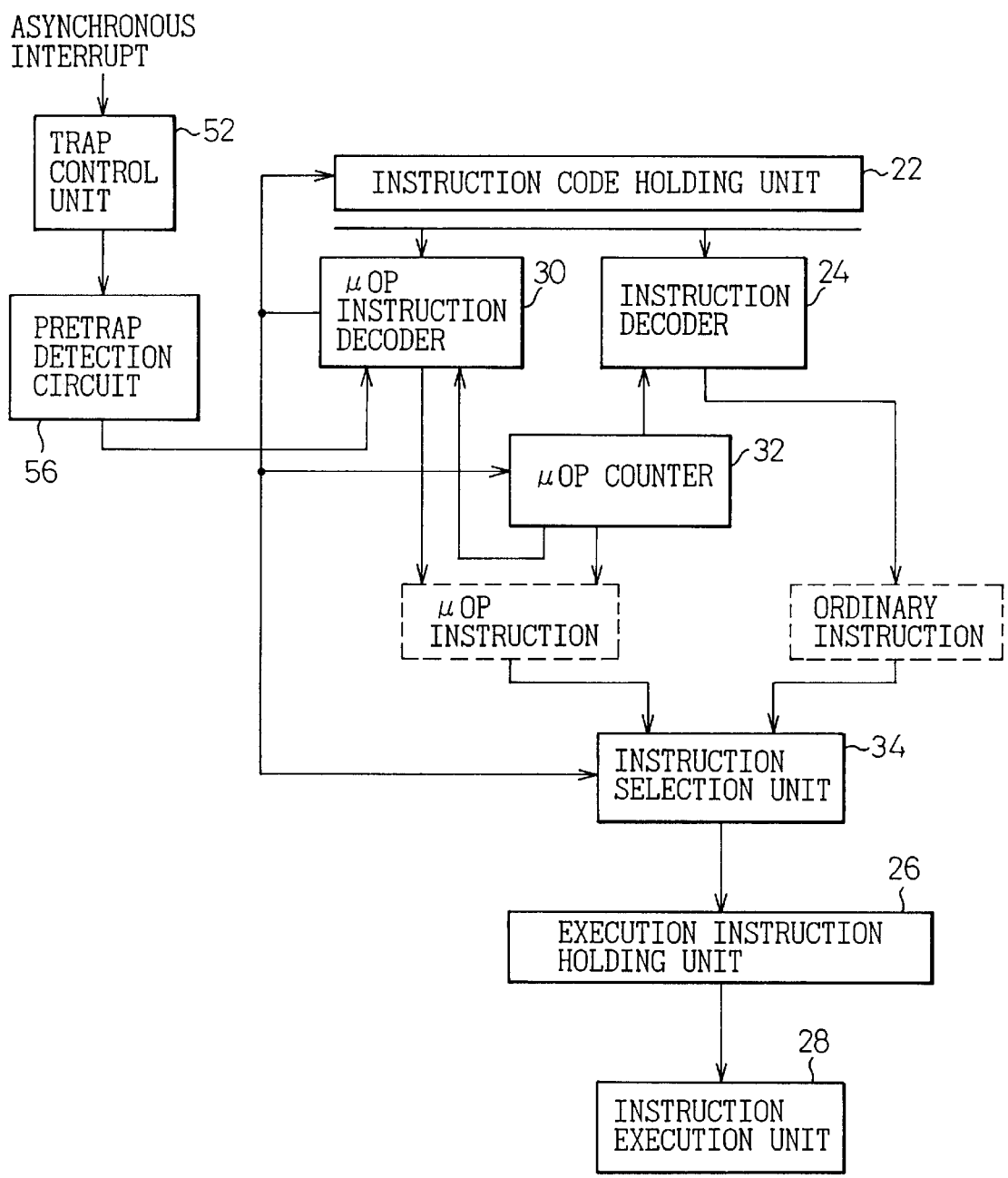
FIG. 17 is a block diagram showing the hardware configuration of a processor according to a ninth embodiment of the present invention.

FIG. 17 is a block diagram showing the hardware configuration of a processor according to a ninth embodiment of the present invention. Elements that are identical to those in the foregoing embodiments will be designated by the same reference numerals and will not be described in detail herein. In the ninth embodiment, there is provided a pretrap circuit 56 which performs control so that no interrupts occur during the issuing of instructions by the μOP instruction decoder 30, by confirming that asynchronous interrupts are not likely to occur before the instruction issue by the μOP instruction decoder 30 is started.

More specifically, based on the internal state of the trap control unit 52 which controls trap interrupts, the pretrap circuit 56 permits the issuing of μOP instructions by the μOP instruction decoder 30 only during the period that asynchronous interrupts are not likely to occur. In this way, asynchronous interrupts are inhibited during the execution of the μOP instruction, serving to simplify the interrupt control logic and to prevent fragmentation of the μOP instructions, and thus achieving simplification of the instruction issue control logic.

Figure 18:
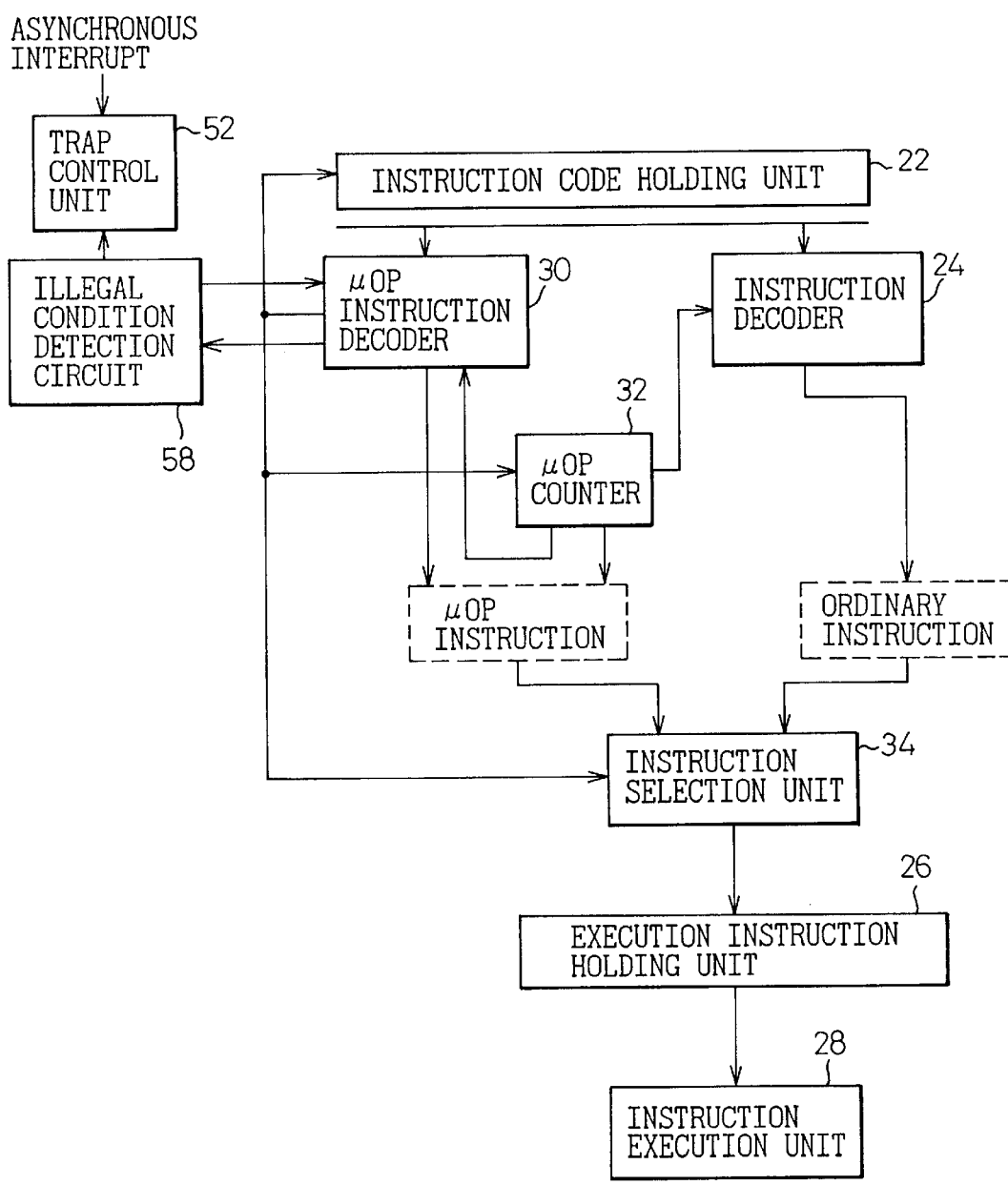
FIG. 18 is a block diagram showing the hardware configuration of a processor according to a 10th embodiment of the present invention.

FIG. 18 is a block diagram showing the hardware configuration of a processor according to a 10th embodiment of the present invention. Elements that are identical to those in the foregoing embodiments will be designated by the same reference numerals and will not be described in detail herein. In the 10th embodiment, there is provided an illegal condition detection circuit 58 which detects an illegal condition of the expanded instruction code in the first instruction issue cycle of the μOP instruction decoder 30 and, when an illegal condition is detected, causes an interrupt to inhibit the μOP instruction decoder 30 from issuing the instruction sequence.

That is, the illegal condition detection circuit 58 detects an illegal condition, such as the condition in which the address specified in an operand of an instruction does not satisfy the required boundary condition, and, in the case of an illegal instruction, produces an output signal to prevent the issuing of an instruction sequence that is to be executed as μOP instructions, and notifies the trap controller 52 in order to cause a trap interrupt. In this way, erroneous issuing of an expanded instruction, such as a block data transfer instruction, can be prevented.

Figure 19:
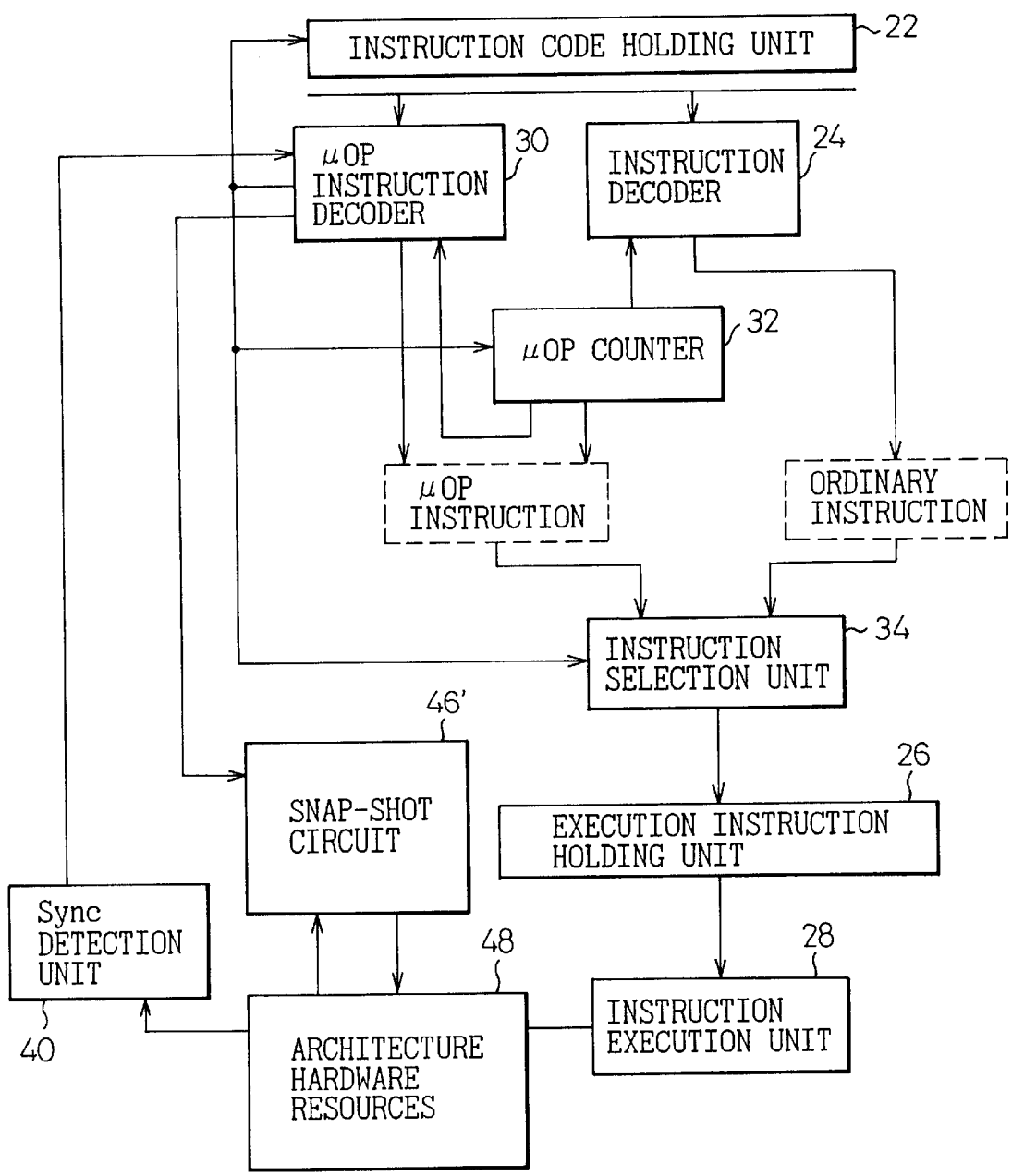
FIG. 19 is a block diagram showing the hardware configuration of a processor according to an 11th embodiment of the present invention.

FIG. 19 is a block diagram showing the hardware configuration of a processor according to an 11th embodiment of the present invention. Elements that are identical to those in the foregoing embodiments will be designated by the same reference numerals and will not be described in detail herein. In the 11th embodiment, the previously described Synch detection unit 40 is provided, and there is further provided a snap-shot circuit 46' which generates a snap-shot of the hardware resources 48 only when the μOP instruction decoder 30 issues the first μOP instruction, but does not generate a snap-shot when the μOP instruction decoder 30 issues the subsequent μOP instructions.

As a result, if an exception occurs in the middle of the second or later μOP instruction, information of the oldest snap-shot, that is, information at the time of the execution of the first μOP instruction pointing to the expanded instruction such as a block data transfer instruction, is reported to the software by a trap interrupt. That is, a notification is made to the software as if the exception occurred in the expanded instruction such as a block data transfer instruction, thus making it possible to prevent the μOP instruction from being recognized by the software.

Figure 20:
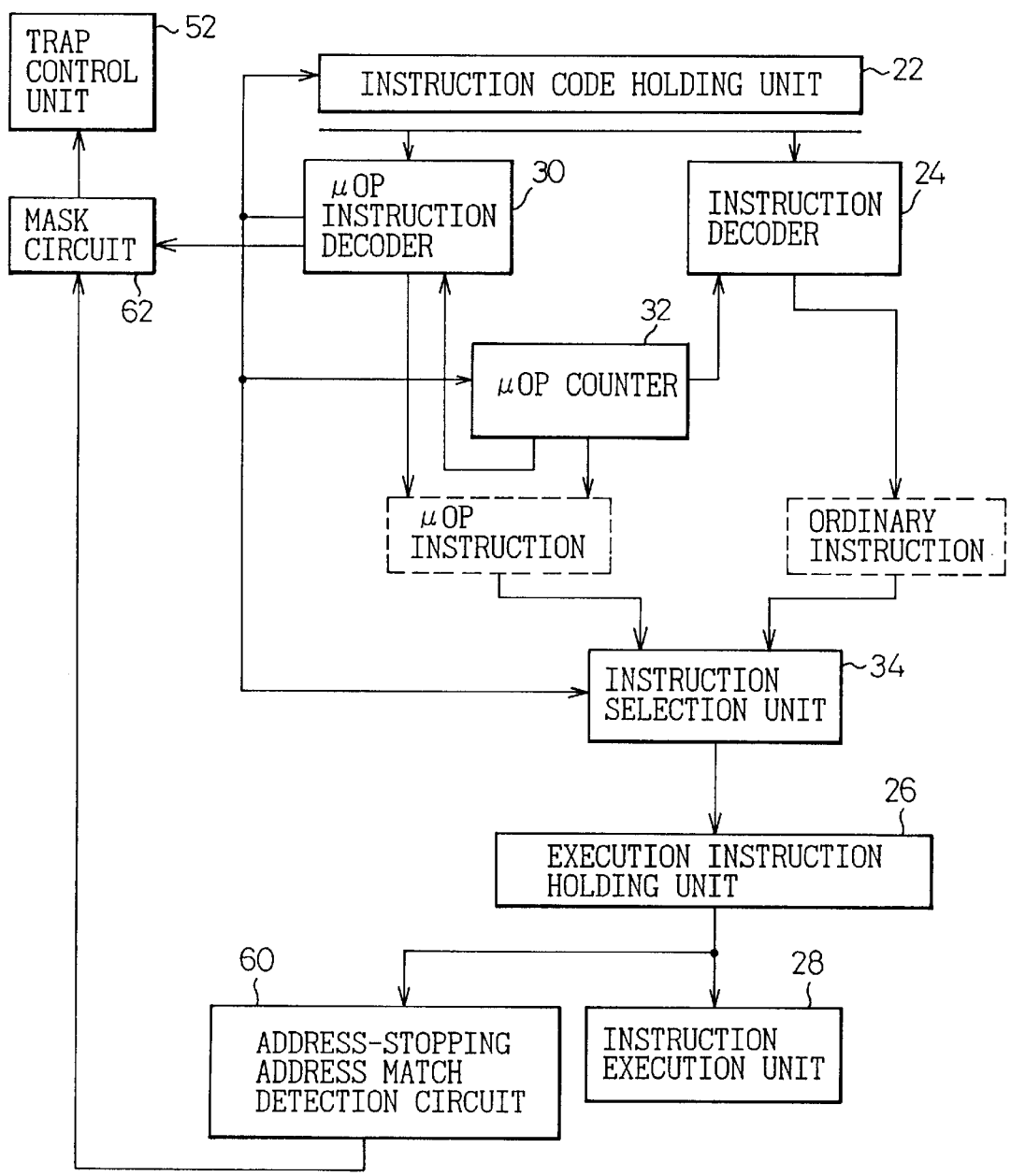
FIG. 20 is a block diagram showing the hardware configuration of a processor according to a 12th embodiment of the present invention.

FIG. 20 is a block diagram showing the hardware configuration of a processor according to a 12th embodiment of the present invention. Elements that are identical to those in the foregoing embodiments will be designated by the same reference numerals and will not be described in detail herein. Generally, a processor includes an address-stopping address match detection circuit 60 for software debugging and other purposes. In the 12th embodiment, there is also provided a mask circuit 62 which masks the output of the address-stopping address match detection circuit 60 during the execution of the μOP instructions issued by the μOP instruction decoder 30, and reports an address match result to the trap control unit 52 when the execution of the last of the μOP instructions issued by the μOP instruction decoder 30 is completed.

This guarantees to issue an address match interrupt after the expanded instruction such as a block data transfer instruction is executed, and the address stopping with respect to the expanded instruction executed in multiple cycles using μOP instructions can thus be realized without software intervention.

As described above, according to the present invention, there is provided a processor adapted to support a complex instruction set without making major modifications to the existing hardware but by adding just a few controls and thereby emulating instructions in hardware.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A processor comprising:

instruction code holding means for fetching and holding a basic instruction code capable of issuing an instruction per cycle or an expanded instruction code not capable of issuing an instruction per cycle;

a first instruction decoder for issuing an instruction by decoding the basic instruction code held in said instruction code holding means;

a second instruction decoder for decoding the expanded instruction code held in said instruction code holding means, and for issuing one instruction per cycle by translating said expanded instruction code into a sequence of multiple instructions;

a counter for counting the number of instructions to be issued by said second instruction decoder, and for outputting a signal indicating that said expanded instruction code is being executed;

instruction selecting means for selecting the instruction issued from said first instruction decoder when executing said basic instruction code and the instruction issued from said second instruction decoder when executing said expanded instruction code;

execution instruction holding means for holding the instruction output from said instruction selecting means; and instruction executing means for executing the contents of the instruction held in said execution instruction holding means.

2. A processor as claimed in claim 1, further comprising means for inhibiting a program counter from being updated each time an instruction is issued by said second instruction decoder.

3. A processor as claimed in claim 1, further comprising means for detecting completion of all instructions previously issued by said first instruction decoder, and wherein said second instruction decoder starts issuing instructions after confirming that an output of said detecting means is on.

4. A processor as claimed in claim 3, further comprising means for generating a flag that is set on when said second instruction decoder has started issuing instructions, and is set off when all the issued instructions are completed, and wherein said first instruction decoder does not issue instructions during the on period of said flag.

5. A processor as claimed in claim 1, further comprising means for generating a signal indicating that instructions are being issued successively by said second instruction decoder, and means for generating, in accordance with said signal, a snap-shot of hardware resources each time an instruction is issued by said second instruction decoder.

6. A processor as claimed in claim 1, further comprising means for generating a flag that is set on when the first instruction is issue by said second instruction decoder, and is set off when the last of the instructions issued by said second instruction decoder is completed, and wherein said first instruction decoder does not issue instructions during the on period of said flag.

7. A processor as claimed in claim 1, further comprising means for generating a flag that is set on when the first instruction is issue by said second instruction decoder, and is set off when the last of the instructions issued by said second instruction decoder is completed, and means for inhibiting asynchronous interrupts during the on period of said flag.

8. A processor as claimed in claim 1, further comprising means for generating a flag that is set on when the first instruction is issue by said second instruction decoder, and is set off when the last of the instructions issued by said second instruction decoder is completed, and a counter which monitors an instruction complete signal from said instruction executing means during the on period of said flag, and counts up each time said signal is set on, and wherein when said counter has counted up to a value equal to the number of instructions to be issued by said second instruction decoder, said processor is transferred to an expanded instruction code execution complete state.

9. A processor as claimed in claim 1, further comprising means for performing control so that no interrupts will occur during the issuing of instructions by said second instruction decoder, by confirming that asynchronous interrupts are not likely to occur before the instruction issue by said second instruction decoder is started.

10. A processor as claimed in claim 1 further comprising means for detecting an illegal condition of said expanded instruction code in the first instruction issue cycle of said second instruction decoder and, when an illegal condition is detected, causing an interrupt to inhibit said second instruction decoder from issuing said instruction sequence.

11. A processor as claimed in claim 1, further comprising means for detecting completion of all instructions previously issued by said first instruction decoder, and means for generating a snap-shot of hardware resources only when said second instruction decoder issues the first instruction, but not generating a snap-shot when said second instruction decoder issues the subsequent instructions.

12. A processor as claimed in claim 1, further comprising means for masking an output of an address-stopping address match detection circuit during the execution of the instructions issued by said second instruction decoder, and for reporting an address match result to an interrupt control circuit when the execution of the last of the instructions issued by said second instruction decoder is completed.

13. A processor as claimed in claim 1, wherein the expanded instruction code to be decoded by said second instruction decoder is a block data transfer instruction code for specifying a transfer of data whose data size is an integral multiple of the data size transferrable by one basic instruction.

14. A processor as claimed in claim 2, wherein the expanded instruction code to be decoded by said second instruction decoder is a block data transfer instruction code for specifying a transfer of data whose data size is an integral multiple of the data size transferrable by one basic instruction.

15. A processor as claimed in claim 3, wherein the expanded instruction code to be decoded by said second instruction decoder is a block data transfer instruction code for specifying a transfer of data whose data size is an integral multiple of the data size transferrable by one basic instruction.

16. A processor as claimed in claim 4, wherein the expanded instruction code to be decoded by said second instruction decoder is a block data transfer instruction code for specifying a transfer of data whose data size is an integral multiple of the data size transferrable by one basic instruction.

17. A processor as claimed in claim 5, wherein the expanded instruction code to be decoded by said second instruction decoder is a block data transfer instruction code for specifying a transfer of data whose data size is an integral multiple of the data size transferrable by one basic instruction.

18. A processor as claimed in claim 6, wherein the expanded instruction code to be decoded by said second instruction decoder is a block data transfer instruction code for specifying a transfer of data whose data size is an integral multiple of the data size transferrable by one basic instruction.

19. A processor as claimed in claim 7, wherein the expanded instruction code to be decoded by said second instruction decoder is a block data transfer instruction code for specifying a transfer of data whose data size is an integral multiple of the data size transferrable by one basic instruction.

20. A processor as claimed in claim 8, wherein the expanded instruction code to be decoded by said second instruction decoder is a block data transfer instruction code for specifying a transfer of data whose data size is an integral multiple of the data size transferrable by one basic instruction.

21. A processor as claimed in claim 9, wherein the expanded instruction code to be decoded by said second instruction decoder is a block data transfer instruction code for specifying a transfer of data whose data size is an integral multiple of the data size transferrable by one basic instruction.

22. A processor as claimed in claim 10, wherein the expanded instruction code to be decoded by said second instruction decoder is a block data transfer instruction code for specifying a transfer of data whose data size is an integral multiple of the data size transferrable by one basic instruction.

23. A processor as claimed in claim 11, wherein the expanded instruction code to be decoded by said second instruction decoder is a block data transfer instruction code for specifying a transfer of data whose data size is an integral multiple of the data size transferrable by one basic instruction.

24. A processor as claimed in claim 12, wherein the expanded instruction code to be decoded by said second instruction decoder is a block data transfer instruction code for specifying a transfer of data whose data size is an integral multiple of the data size transferrable by one basic instruction.

* * * * *